United States Patent

Foster et al.

[11] Patent Number: 6,013,585
[45] Date of Patent: Jan. 11, 2000

[54] PULTRUDED CONVEYOR SLAT AND PULTRUSION METHOD

[75] Inventors: Raymond Keith Foster, P.O. Box 1, Madras, Oreg. 97741; James Bradley Fite, Redmond, Oreg.

[73] Assignee: Raymond Keith Foster, Madras, Oreg.

[21] Appl. No.: 09/044,200

[22] Filed: Mar. 17, 1998

[51] Int. Cl.⁷ .................................................. B65G 25/00
[52] U.S. Cl. ........................... 442/43; 198/750.1; 442/44; 442/46; 442/47; 442/58
[58] Field of Search ........................... 198/750.1; 442/43, 442/44, 46, 47, 58

[56] References Cited

U.S. PATENT DOCUMENTS

| | | | |
|---|---|---|---|
| Re. 33,196 | 4/1990 | Foster | 198/750 |
| Re. 35,022 | 8/1995 | Foster | 198/750.5 |
| 4,580,678 | 4/1986 | Foster | 198/750 |
| 4,785,929 | 11/1988 | Foster | 198/750 |
| 5,301,798 | 4/1994 | Foster | 198/750 |
| 5,447,222 | 9/1995 | Foster | 198/750 |
| 5,727,672 | 3/1998 | Foster | 198/750 |

*Primary Examiner*—Christopher Raimund
*Attorney, Agent, or Firm*—Delbert J. Barnard

[57] ABSTRACT

A resin matrix (70) is formed and reinforcement fibers (72) and thermoplastic material (74) are added to the resin matrix (72). The resin matrix (70), the reinforcement fibers (72) and the thermoplastic material are moved through a pultrusion die (76), by pulling on the reinforcement fibers (72), to form a conveyor slat having a top portion (38) and a pair of laterally spaced apart side portions (40, 42) depending from the top portion (38). In the pultrusion die (76) heat is applied to melt the thermoplastic material (74) and cause it to migrate to an outer surface portion of the slat body. A veil (90) of thermoplastic material may be bonded to the surface layer of thermoplastic material.

13 Claims, 7 Drawing Sheets

PULTRUDED CONVEYOR SLAT AND PULTRUSION METHOD

TECHNICAL FIELD

This invention relates to the provision of a fiber reinforced, composite conveyor slat, manufactured by pultrusion, and to a pultrusion method for manufacturing such conveyor slat.

BACKGROUND OF THE INVENTION

Reciprocating slat conveyors comprise a plurality of side by side conveyor slats that are driven in one direction for advancing a load and are retracted in the opposite direction. Some reciprocating slat conveyors are divided into both "sets" and "groups" of conveyor slats. The slats of each "set" are moved together. Each "group" includes one slat from each "set." In some slat conveyors, all of the slats are driven in unison, in the conveying direction, and are then retracted sequentially, one set at a time. It has also been proposed to drive a majority of the conveyor slat sets in the conveying direction while retracting the remaining conveyor slat sets, to continuously move the load on the conveyor. An example of the first type of conveyor is disclosed in my U.S. Pat. No. Re. 35,022, granted Aug. 22, 1995. An example of the second type of conveyor is disclosed in my U.S. Pat. No. 4,580,678, granted Apr. 8, 1986.

Conveyor slats have been constructed from aluminum, steel and structural plastic. The aluminum and structural plastic slats are formed by extrusion. The steel slats are roll formed. Example aluminum slats are disclosed by my U.S. Pat. No. 4,785,929, granted Nov. 22, 1988. Example steel slats are disclosed by my U.S. Pat. No. Re. 33,196, granted Apr. 10, 1990. Example structural plastic slats are disclosed by my U.S. Pat. No. 5,447,222, granted Sep. 5, 1995, and by U.S. Pat. No. 5,301,798, granted Apr. 12, 1994, to Arthur L. Wilkins. The Wilkins U.S. Pat. No. 5,301,798 discloses forming slats by extrusion. My U.S. Pat. No. 5,447,222 discloses forming slats by co-extrusion.

The term pultrusion is used to describe both a process of manufacture and the products manufactured by the process. The process begins with the delivery of an organized schedule of reinforcement fibers from storage creels through guides into an impregnation zone where the reinforcement fibers are saturated with a liquid thermal setting resin that is reactive at elevated temperatures yet stable at ambient temperatures. After saturation, the reinforcement fibers are moved from the impregnation zone to and through formers in which they are formed progressively in stages to remove excess resin and to achieve the approximate geometry of the finished profile. Following this pre-forming step, the materials are compacted into the final densified structure as they enter the tapered mouth of a pultrusion die. The pultrusion die is a self contained reaction vessel in which rapid polymerization of the resin occurs when exposed to the elevated die temperature environment. The moving material is constrained within the close tolerances of the die as it is being cured. Upon achieving a sufficient level of polymerization, the material is pulled out from the die and is generally allowed an interval of movement through space so as to cool by natural or forced convection to a level below which the pulling device, employed to grip and pull the product, will not damage the composite profile. The pulling mechanism is followed by a flying cut-off saw which enables the product to be cut to length without interruption of the continuous pull motion.

There is a need for conveyor slats that are chemical resistant and non-corrosive and yet are light weight, tough and strong. There is also a need for conveyor slats formed by pultrusion that have desirable surface characteristics, and in particular to a way of forming the conveyor slats to include a surface veil made from a thermoplastic material. A principal object of the present invention is to provide such a conveyor slat or other members.

DISCLOSURE OF THE INVENTION

A composite member formed by pultrusion, according to the present invention, includes a resin matrix forming a body. There are reinforcement fibers in the resin matrix. The member is formed to include a thermoplastic material in the resin matrix that is substantially at an outer surface portion of the member. A thermoplastic veil is bonded to the thermoplastic material to provide a thermoplastic layer at the outer surface portion. According to an aspect of the invention, the composite member may be a conveyor slat for a reciprocating slat conveyor.

Thermoplastic material may be added to the resin matrix in a number of ways. Firstly, thermoplastic particles may be sprayed onto a reinforcement cloth that has been soaked with resin. Secondly, the thermoplastic particles may be added to a resin bath through which the cloth is moved. Thirdly, thermoplastic particles may be electrostatically bonded or thermally fused to the cloth. Fourthly, a thin film or ribbon of thermoplastic material may be fed into the pultrusion die immediately below a reinforcement fabric formed of woven glass fibers or the like.

According to an aspect of the invention, the resin, the reinforcement fabric and the thermoplastic material in the resin matrix are moved through a pultrusion die that has a heated section. In this heated section the thermoplastic material in the matrix melts and forms a thermoplastic surface layer or skin. Later, a thermoplastic veil may be bonded to the thermoplastic surface layer or skin.

These and other advantages, objects and features will become apparent from the following best mode description, the accompanying drawings, and the claims, which are all incorporated herein as a part of the description or disclosure of the invention.

BRIEF DESCRIPTION OF THE DRAWINGS

Like reference numerals are used to designate like parts throughout the several views of the drawing, and.

BEST MODE FOR CARRYING OUT THE INVENTION

Figure 1:
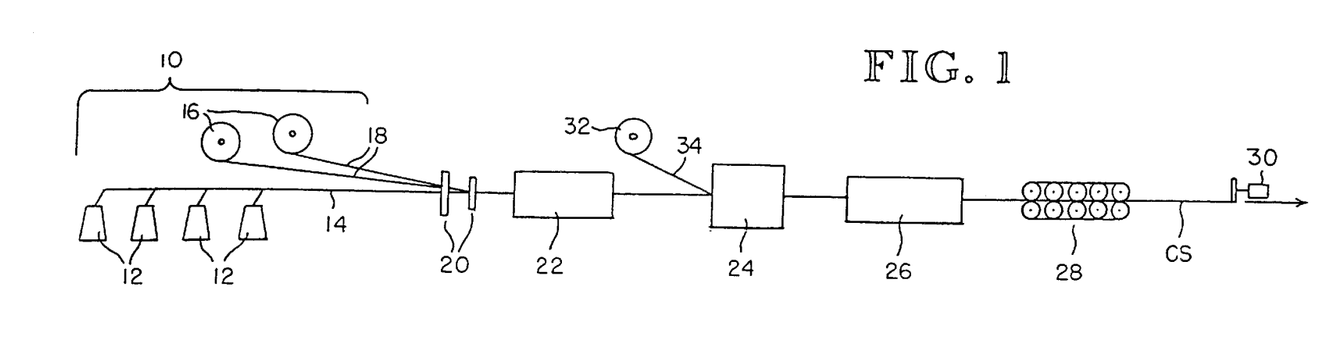
FIG. 1 is a schematic diagram of a pultrusion process used for forming protruded conveyor slats or the like in accordance with the present invention.
Figure 2:
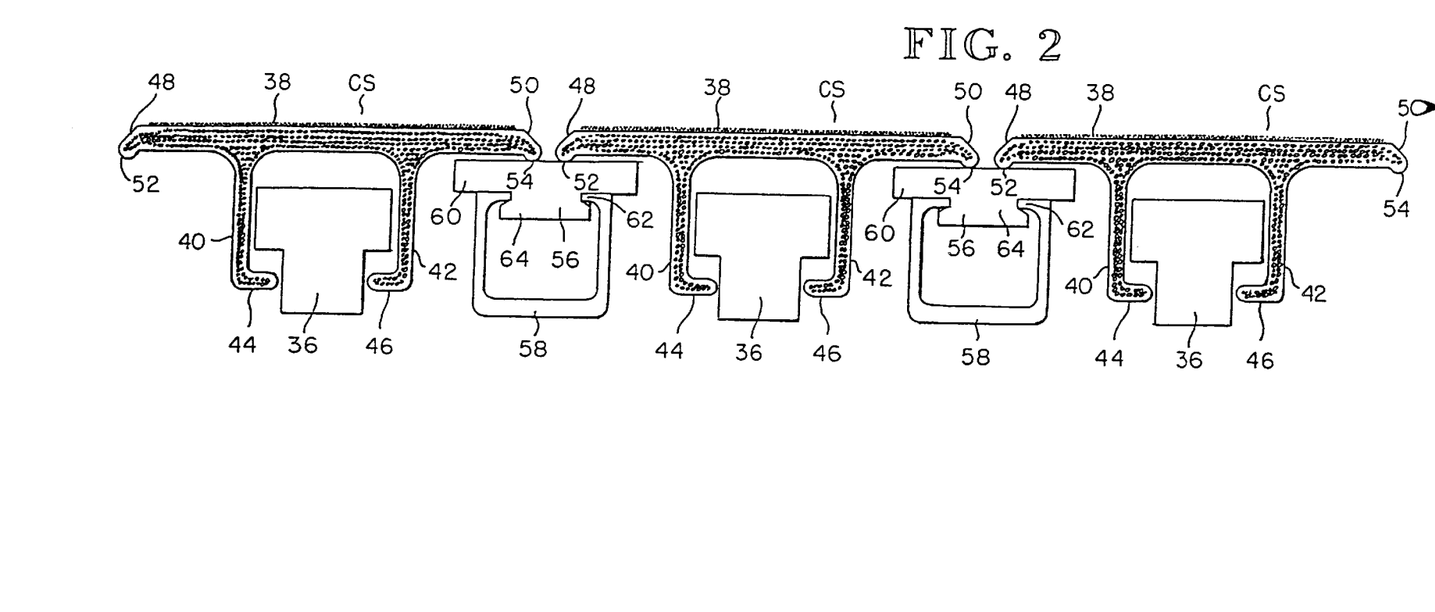
FIG. 2 is a fragmentary cross-sectional view of a slat conveyor that includes conveyor slats constructed in accordance with the present invention.

FIGS. 1 and 2 are from U.S. Pat. No. 5,727,672, granted Mar. 17, 1998, and entitled Pultruded Conveyor Slats.

The reinforcement fibers 14 and fabrics or mats 18 are delivered to and through guides 20. From the guides 20 they enter an impregnation zone 22 where they are saturated with a liquid thermosetting resin that is reactive yet stable at ambient temperatures. After saturation, the reinforcement fibers 14 and fabrics 18 are moved from the impregnation zone 22 to and through preformers 24 in which they are moved progressively in stages to remove excess resin and to achieve the approximate geometry of the finished profile of the formed member. Following this preforming step, the materials are compacted into the final densified slat structure as they enter the mouth of a pultrusion die 26. The pultrusion die 26 is a self-contained reaction vessel in which rapid polymerization of the resin occurs when exposed to the elevated die temperature environment. The moving material is constrained within the close tolerances of the die as it is being cured. Upon achieving a sufficient level of polymerization, the material is pulled out from the die 26 and is generally allowed an interval of movement through space so as to cool by natural or forced convection to a level below which the pulling device 28, employed to grip and pull the formed member, will not damage the composite profile. The pulling mechanism 28 is followed by a flying cut-off saw 30 which enables the product to be cut to length without interruption of the continuous pull motion. One or more veil fabrics may be added to cover the resin coated fibers before they are introduced into the pre-former 24. Or, one or more veil fabrics may be added to the slat body downstream of the preforms and upstream of the die 26. FIG. 1 shows a single reel 32 of a veil fabric 34.

FIG. 2 shows three conveyor slats CS positioned side by side on guide members 36. The conveyor shown by FIG. 2 is basically like the conveyor disclosed by U.S. Pat. No. 5,727,672, granted Mar. 17, 1998, to Raymond K. Foster. The contents of this patent are incorporated herein by this specific reference.

In preferred form, each conveyor slat CS has a top portion 38 and a pair of side portions 40, 42. Side portions 40, 42 include lower sections 44, 46 that turn inwardly towards each other. The conveyor slat's top 38 includes wing portions 48, 50 that extend laterally outwardly from the side portions 40, 42. Wing portions 48, 50 include downwardly projecting flanges or lips. As shown by FIG. 2, the downwardly projecting lips or flanges have lower edges 52, 54 that contact and ride on bearing members 56. The bearing members 56 are constructed from a high molecular weight resinous material, referred to as UHMW plastic. This material is readily available, is strong, is easily formed to the desired cross section, and has exceptionally low surface friction. It is known to be an excellent bearing material.

Bearing members 56 extend lengthwise along support members 58, shown in the form of open top channel metal extrusions or roll formed shapes. In preferred form, the bearing members 56 are formed to include top portions 60, neck portion 62, and bottom portions 64. Top portions 60 set down onto upper surfaces of the support members 58. The neck portions 62 are approximately equal in width to the distance between two endwardly directed lips that form the top portions of the support members 58. Bottom portions 64 of bearing members 56 are wider than the distance between the lips. Thus, a slot is formed on each side of each bearing member 56, laterally outwardly from the neck 62 and vertically between the top and bottom portions 60, 62. The lips of the support members 58 project into these slots. In this manner, the bearing members 56 are held against sideways movement and vertical movement up off of the support members 58. One or more rivets, or the like (not shown), may be used to connect the bearing members 56 to the support members 58, to secure them against longitudinal movement.

When the conveyor slats 38 are under load, the edges 52, 54 and the top portion 60 of the bearing members 56 form an effective and very simple seal against the migration of particulate material between the edges 52, 54 and the top portions 60 of the bearing members 56. During use, the reciprocating movement of the edges 52, 54 on the top portions 60 of the bearing members 56 will over time form grooves in the upper surfaces of the upper portions 60 of the bearing members 56. In response to the wear, the edges 52, 54 and the grooves will conform to each other, further enhancing the sealing contact between the conveyor slats 38 and the bearing members 56.

The most commonly used pultrusion resin is a flexible isophthalic polyester. This resin is more forgiving in composites with sharp radii, different thicknesses and heavy wall cross-sections. The surface remains shiny with minimum scaling at the slower pultrusion speeds. Exotherm stress cracks are essentially eliminated. This resin molds well with the conditions under which structures are pultruded, i.e., slower line speeds due to more difficult part design and consequent reinforcement placement requirements. This resin is set forth by way of example only. The present invention is not limited to any particular resin.

Fiberglass is a typical and popular reinforcement fiber material, both for reinforcement strands and for reinforcement cloth or fabric. However, the invention is not limited to the use of glass reinforcement fibers. Other reinforcement fibers may be used, such as nylon fibers, polyester fibers, aramids, and carbon fibers, for example.

Thermoplastic materials provide desirable surface characteristics for some members. However, it is not possible to merely add a thermoplastic veil to the isophthalic polyester resin and have it bond to the resin. According to an aspect of the present invention, such bonding is made possible by forming the pultruded member to include a thermoplastic material in the resin and then melting the thermoplastic material to provide a thermoplastic surface layer or film on the member to which a thermoplastic veil may be bonded.

Figure 3:
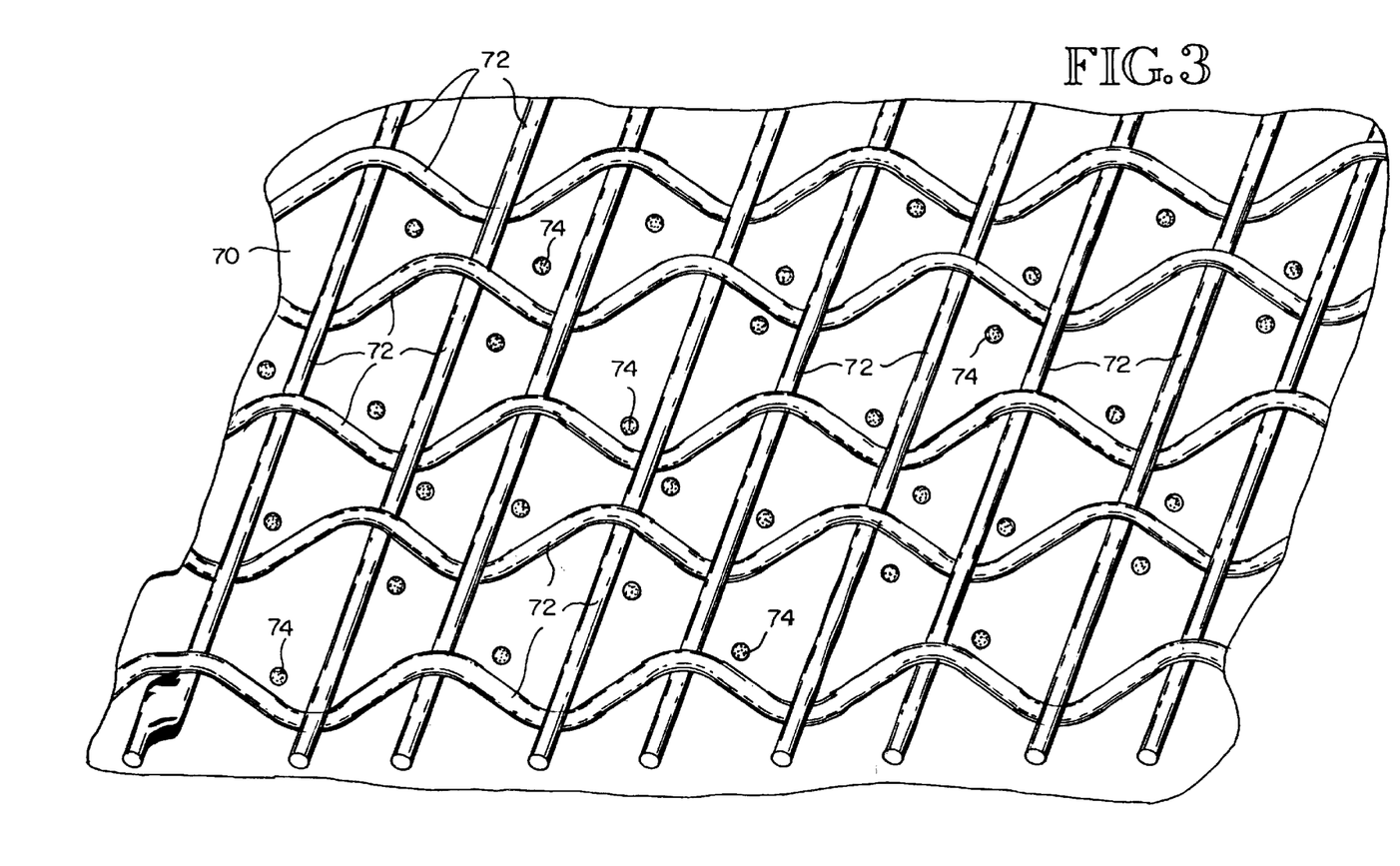
FIG. 3 is a fragmentary view of a reinforcement fabric and thermoplastic particles that are incorporated into a resin matrix in which the fabric is embedded, said view showing the thermoplastic particles distributed throughout the resin matrix.

FIG. 3 shows a region of a resin body 70 that includes reinforcement fibers in the form of a woven cloth 71. FIG. 3 shows particles 74 of a thermoplastic material that have been added to the resin 70. The thermoplastic particles 74 may be sprayed onto the cloth 71 after it has been soaked with resin or the particles 74 may be added to resin 70 in a bath through which the cloth 71 is moved.

Figure 6:
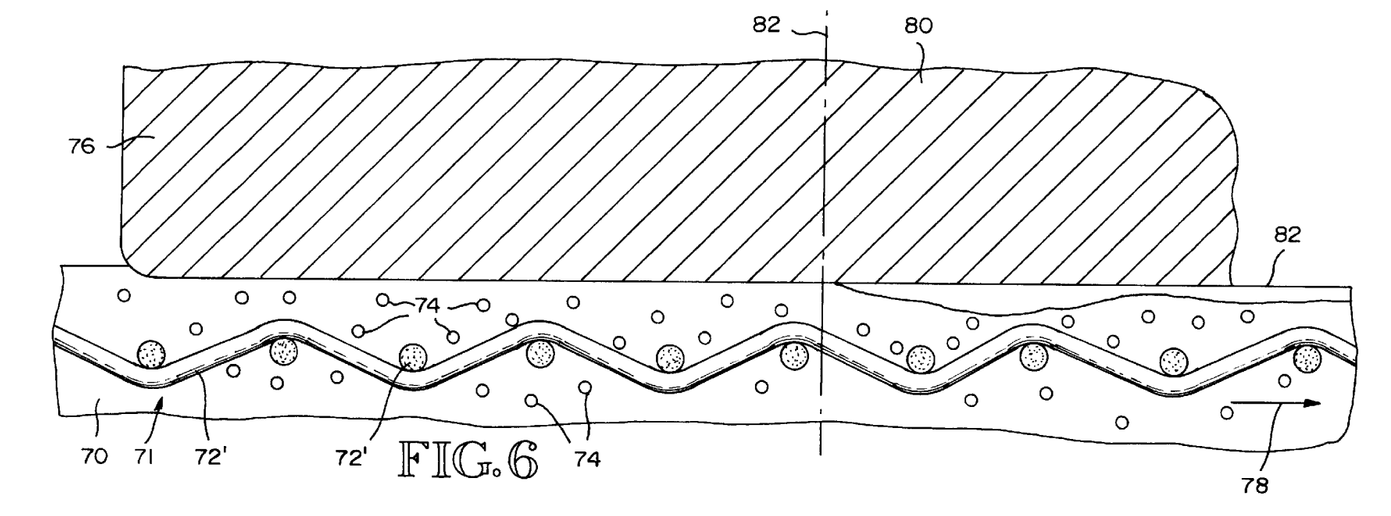
FIG. 6 is a fragmentary longitudinal sectional view showing a reinforcement fabric, a resin matrix and particles of a thermoplastic material moving relatively through a die.

FIG. 6 is a fragmentary view of a resin matrix 70 being moved through a pultrusion die in the direction of arrow 78. The die 76 includes a heated section 80 starting at about the position of line 82. When the resin 70, the cloth fibers 72 and the thermoplastic particles 74 are moved through the heated section 80 of the die, the thermoplastic particles 74 melt and form a thermoplastic surface layer 82.

Figure 4:
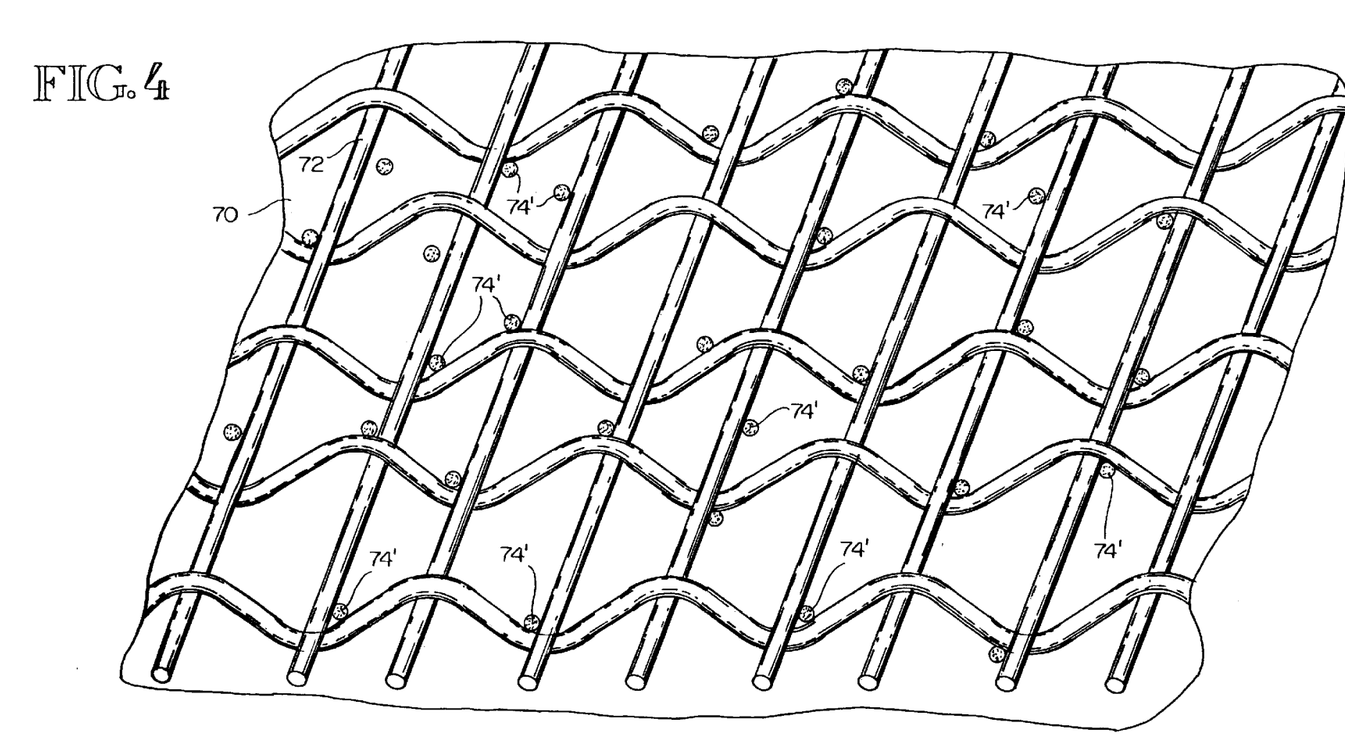
FIG. 4 is a view like FIG. 3 but showing the thermoplastic material bonded to the fibers of the fabric.

FIG. 4 shows a modified construction in which the thermoplastic particles 74' are either electrostatically bonded or thermally fused to the cloth fibers 72. When the resin 70, cloth fibers 72 and thermoplastic particles 74' are moved through the heated section 80 of a die 76, the thermoplastic particles melt and form a thermoplastic surface layer, substantially the same as with the first embodiment in which thermoplastic particles 74 are distributed through the resin matrix 70.

Figure 5:
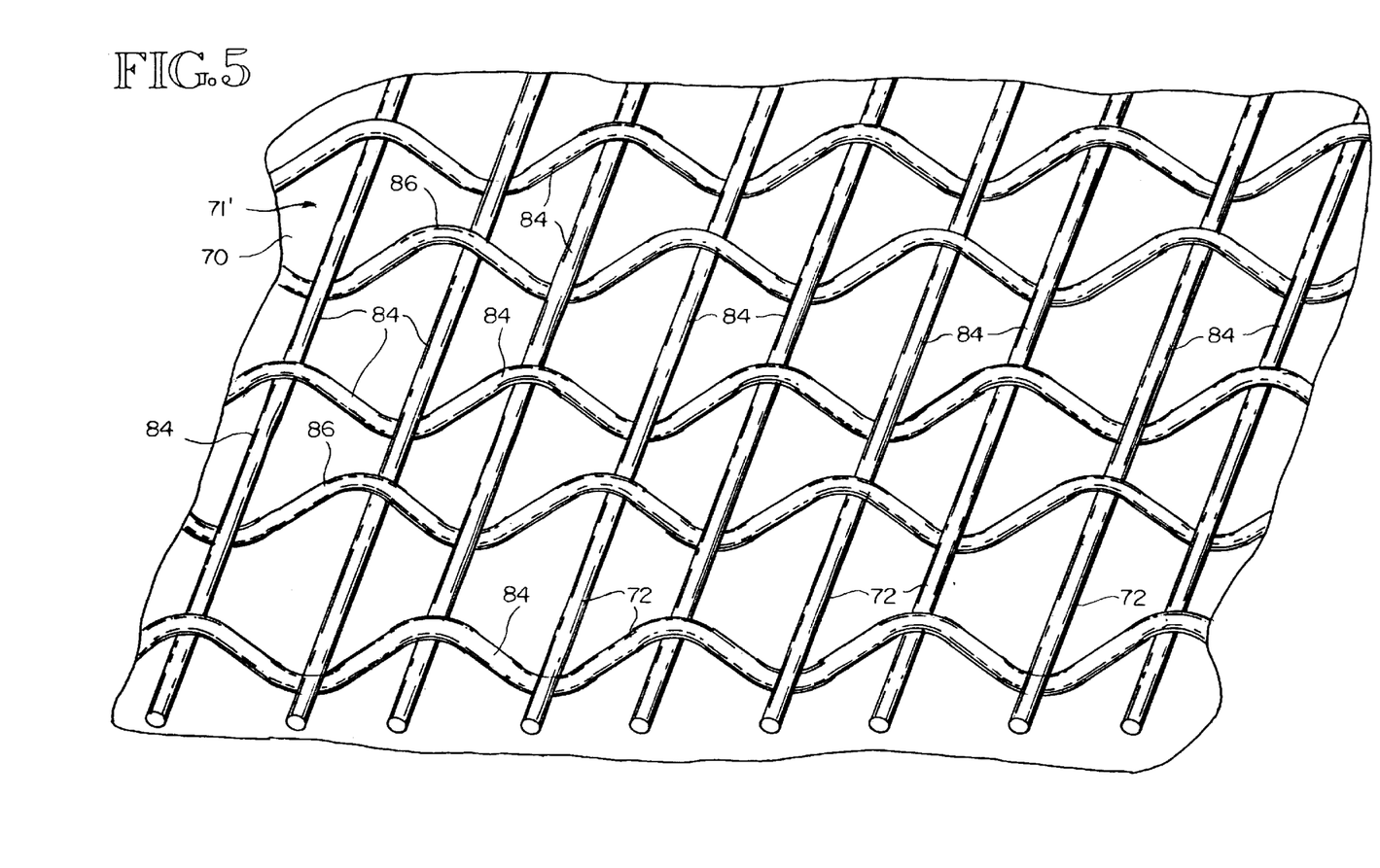
FIG. 5 is a view like FIGS. 3 and 4, but showing the fabric including some fibers of a thermoplastic material.
Figure 7:
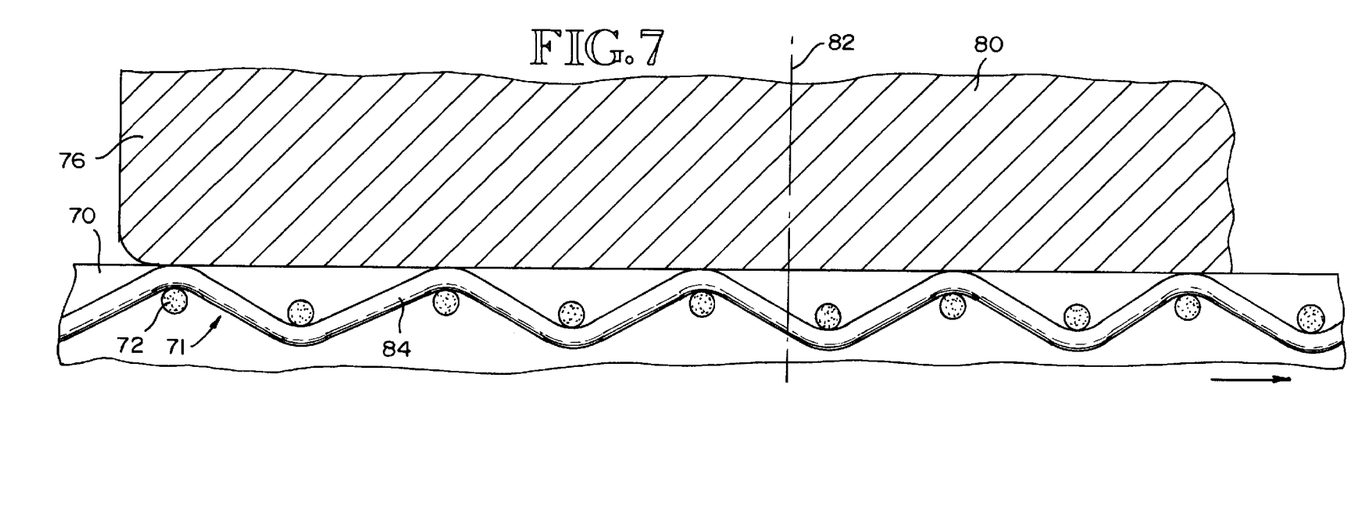
FIG. 7 is a view like FIG. 6 but showing a fabric that includes some fibers of a thermoplastic material.

FIGS. 5 and 7 show another modified embodiment in which the fabric 71' is formed from a combination of glass fibers 84 and thermoplastic fibers 86. As shown by FIG. 7, when the resin 70 and cloth 71' are moved through the heated section 80 of a die 78, the thermoplastic fibers melt and form a thermoplastic surface layer or skin, essentially the same as with the first two embodiments.

Figure 8:
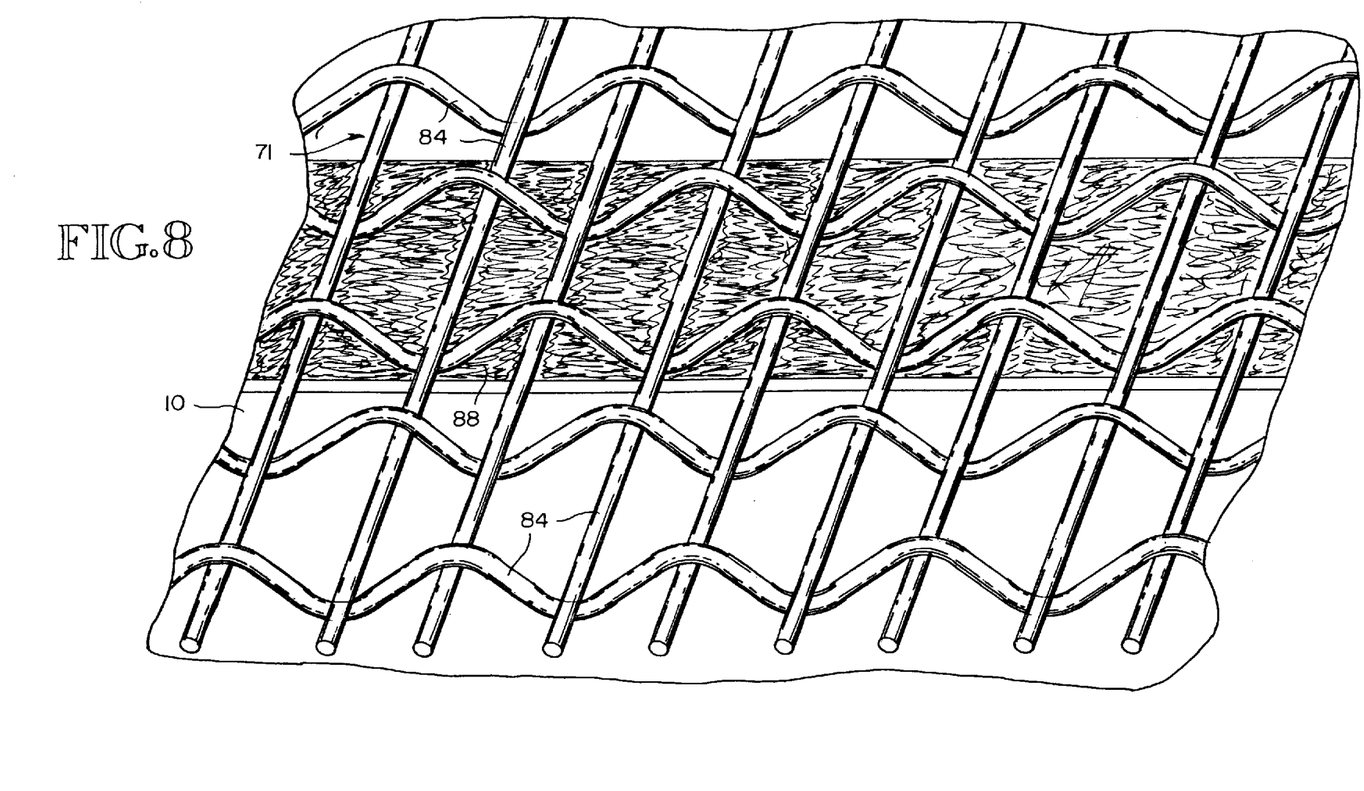
FIG. 8 is a view like FIGS. 3—5 but showing a thin film of thermoplastic material positioned below the reinforcement fabric.

FIG. 8 shows another embodiment in which a thin film or ribbon of thermoplastic material 88 is fed into the die immediately below a fabric 71 formed of woven glass fibers 84. The fabric 71 and thermoplastic material 82 are close to a surface boundary of the resin body 70. When the resin 70, cloth 71 and thermoplastic film 88 are fed through the heated section 80 of the die 76, the thermoplastic film 88 melts to form a thermoplastic surface layer or skin, essentially as in the earlier described embodiments.

Figure 9:
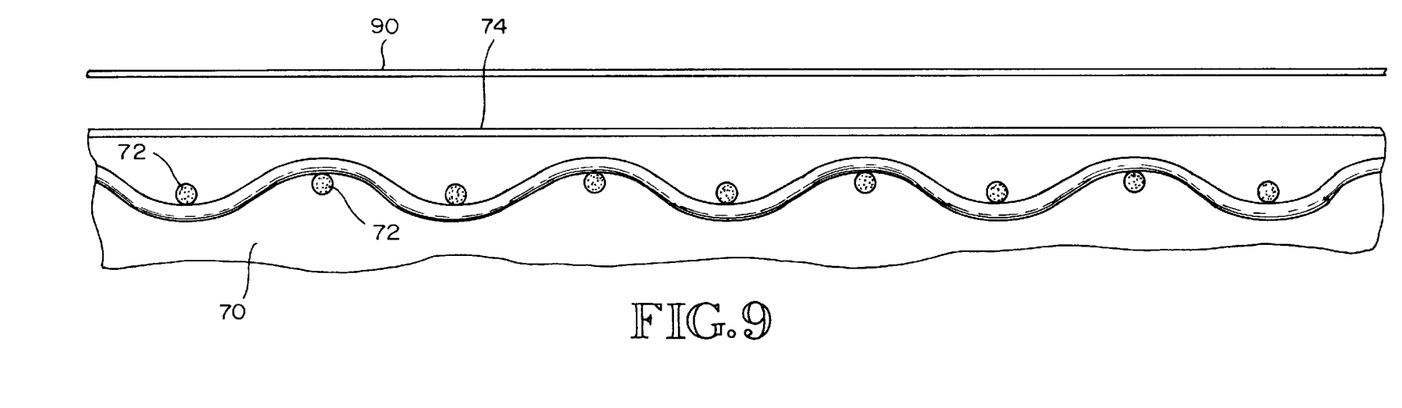
FIG. 9 is a fragmentary longitudinal sectional view of an elongated body formed by pultrusion showing a surface layer of thermoplastic material and a veil of thermoplastic material spaced from the surface layer.
Figure 10:
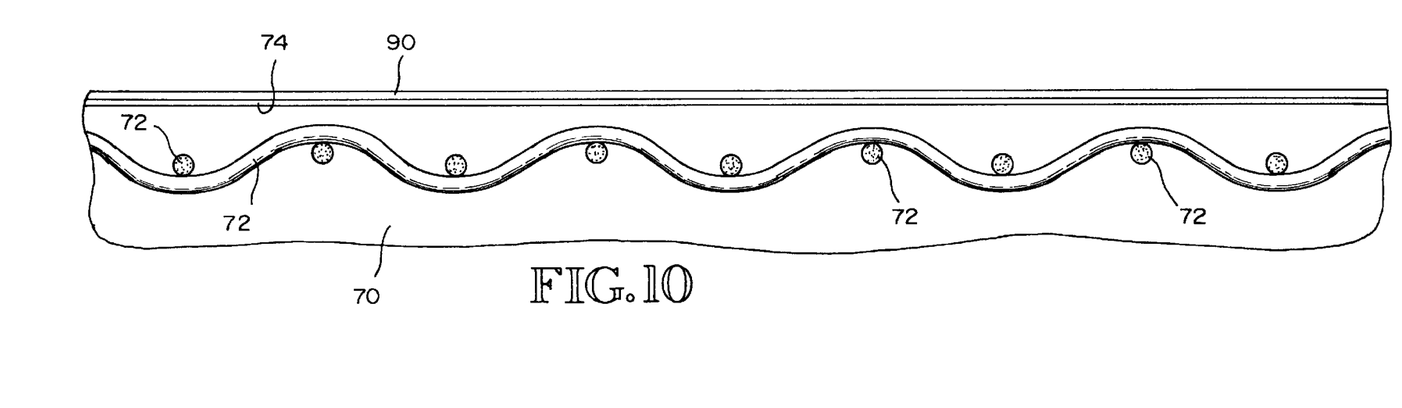
FIG. 10 is a view like FIG. 9 but with the veil bonded to the surface layer.

FIG. 9 shows a thermoplastic surface layer 42 that may be formed by any one of the ways described above in connection with FIGS. 3–8. Veil 70 of thermoplastic material is shown spaced from the thermoplastic surface layer 74. FIG. 10 shows the thermoplastic veil 90 bonded to the thermoplastic layer 74.

As is known to those skilled in the art, a thermoplastic material is a plastic that becomes soft when heated and which hardens when cooled. A thermoset plastic becomes hard when heated and does not become soft when reheated. Example thermoplastic resins are polystyrene and polyethylene. There is a very large number of thermoplastic materials and the invention is not limited to any particular thermoplastic material.

The illustrated and/or described embodiments are only examples of the present invention and, therefore, are non-limitive. It to be understood than many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. For use in a reciprocating slat conveyor having a plurality of adjacent conveyor slats that are mounted to be selectively reciprocated endwise, a pultruded conveyor slat, comprising:

a thermosetting resin matrix forming an elongated slat body having a top portion and a pair of laterally spaced apart side portions depending from said top portion, said side portions having lower sections, said resin matrix also having an outer surface portion;

reinforcement fibers in said resin matrix; and thermoplastic material in said resin matrix substantially at said outer surface portion.

2. A conveyor slat according to claim 1, further comprising a thermoplastic veil on said outer surface that is bonded to the thermoplastic material in the resin matrix.

3. A conveyor slat according to claim 1, wherein at least some of the thermoplastic in the resin matrix comprises thermoplastic particles that were added to the resin matrix and then heated during pultrusion to form a thermoplastic region substantially at said outer surface.

4. A conveyor slat according to claim 1, wherein at least some of the thermoplastic in the resin matrix comprises thermoplastic particles that were electrostatically bonded to the reinforcement fibers and then heated during pultrusion to form a thermoplastic region substantially at said outer surface.

5. A conveyor slat according to claim 1, wherein the resin matrix includes a cloth formed of reinforcement fibers and fibers of thermoplastic material, and wherein during pultrusion the thermoplastic fibers are heated to form a thermoplastic region substantially at said outer surface, to which the thermoplastic veil is bonded.

6. A conveyor slat according to claim 1, wherein at least some of the reinforcement fibers are woven to form a cloth.

7. A conveyor slat according to claim 3, wherein at least some of the reinforcement fibers are woven to form a cloth.

8. A conveyor slat according to claim 4, wherein at least some of the reinforcement fibers are woven to form a cloth.

9. A method of constructing a conveyor slat for a reciprocating slat conveyor, comprising:

providing a thermosetting resin;

adding reinforcement fibers and thermoplastic material to said resin;

pulling on the reinforcement fibers to move the reinforcement fibers, the resin and the thermoplastic material through a pultrusion die, for forming an elongated slat body having a top portion and a pair of laterally spaced apart side portions depending from said top portion; and heating the resin, the reinforcement fibers and the thermoplastic material in the pultrusion die, and providing sufficient heat to melt the thermoplastic material and cause it to migrate to an outer surface portion of the slat body.

10. The method of claim 9, comprising bonding a thermoplastic veil to the thermoplastic layer on the outer surface portion of the slat body.

11. The method of claim 9, comprising adding thermoplastic particles to the resin.

12. The method of claim 9, comprising bonding thermoplastic particles to the reinforcement fibers before adding the reinforcement fibers to the resin.

13. The method of claim 9, comprising providing a cloth composed of reinforcement fibers and fibers of thermoplastic material woven together.

\* \* \* \* \*